(12) United States Patent
Knoche et al.

(10) Patent No.: US 11,712,832 B2
(45) Date of Patent: Aug. 1, 2023

(54) METHOD AND DEVICE FOR PRODUCING A MELT AND/OR PLASTIC FILM

(71) Applicant: BRÜCKNER MASCHINENBAU GmbH, Siegsdorf (DE)

(72) Inventors: Thomas Knoche, Traunstein (DE); Maximilian Armbruster, Wasserburg a. Inn (DE); Andreas Hoffmann, Stephanskirchen (DE); Sebastian Frass, Stephanskirchen (DE); Heiko Krippner, Traunstein (DE); Steffen Kuhnigk, Inzell (DE)

(73) Assignee: Brückner Maschinenbau GmbH, Siegsdorf (DE)

( * ) Notice: Subject to any disclaimer, the term of this patent is extended or adjusted under 35 U.S.C. 154(b) by 179 days.

(21) Appl. No.: 16/932,232

(22) Filed: Jul. 17, 2020

(65) Prior Publication Data
US 2021/0016486 A1 Jan. 21, 2021

(30) Foreign Application Priority Data

Jul. 18, 2019 (DE) ...................... 10 2019 119 505.5

(51) Int. Cl.
*B29C 48/91* (2019.01)
*B29C 48/88* (2019.01)
(Continued)

(52) U.S. Cl.
CPC ............ *B29C 48/914* (2019.02); *B29C 48/08* (2019.02); *B29C 48/1472* (2019.02);
(Continued)

(58) Field of Classification Search
CPC B29C 48/08; B29C 48/914; B29L 2031/3468
See application file for complete search history.

(56) References Cited

U.S. PATENT DOCUMENTS 2,688,155 A * 9/1954 Nadeau ................. B29C 48/915
425/74
2,878,521 A * 3/1959 Kenyon ................. B29C 48/08
264/216
(Continued)

FOREIGN PATENT DOCUMENTS

CN 1223929 7/1999
CN 1239452 12/1999
(Continued)

OTHER PUBLICATIONS

Deng, Che, "Discussion on Additive Precipitation in Cast Polypropylene Film Production", Plastics Packaging, No. 04, pp. 44-48, dated Dec. 31, 1998.
(Continued)

*Primary Examiner* — Atul P. Khare
(74) *Attorney, Agent, or Firm* — Nixon & Vanderhye P.C.

(57) ABSTRACT

An improved method and an improved device for producing a monoaxially or biaxially stretched plastic film are distinguished, inter alia, by the following features:
In the intermediate space (Z) tapering in a wedge shape to the contact line (111, 11') between the melt film or plastic film (5, 5') and the roller jacket (9) spaced apart therefrom or the roller surface (9') spaced apart therefrom of the cooling roller (1, 1'), at least one device for preventing precipitation of condensate (K) in the intermediate space (Z) is used and is designed such that precipitation of condensate (a) on the underside (5a) of the melt film or plastic film (5, 5') facing the roller jacket (9) or on the roller jacket (9) of the cooling roller (1, 1') is prevented, and/or a condensate (K) which has precipitated there evaporates or vaporises, and/or condensate disposed in the intermediate space (Z) is transported away, suctioned off, or blown out and/or runs out to the side.

15 Claims, 13 Drawing Sheets

Figure 1:
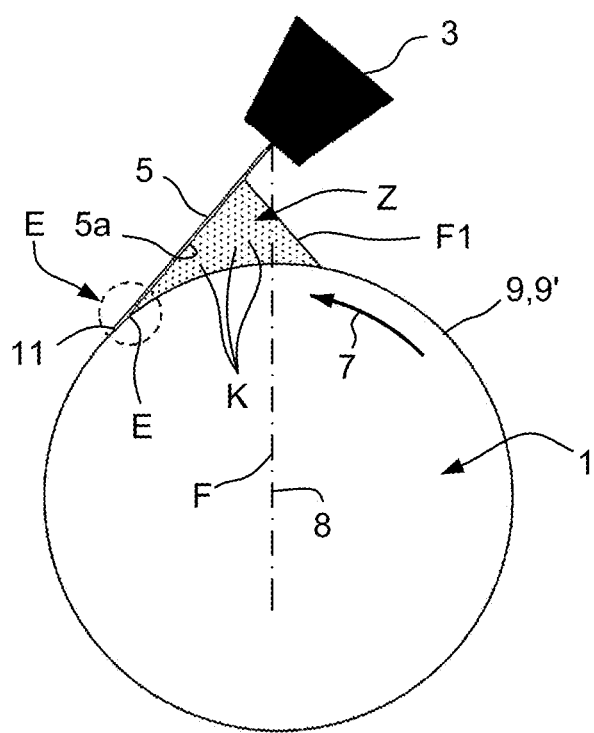

(51) Int. Cl.
  *B29C 48/08* (2019.01)
  *B29C 48/27* (2019.01)
  *B29C 48/14* (2019.01)
  *B29L 31/34* (2006.01)
  *B29C 55/12* (2006.01)

(52) U.S. Cl.
  CPC ............ *B29C 48/274* (2019.02); *B29C 55/12* (2013.01); *B29L 2031/3468* (2013.01)

(56) References Cited

U.S. PATENT DOCUMENTS

| | | | | |
|---|---|---|---|---|
| 3,154,608 | A * | 10/1964 | Aronsenarthurn | B29C 48/916 425/232 |
| 3,423,493 | A | 1/1969 | Klenk et al. | |
| 3,502,757 | A * | 3/1970 | Spencer | B29C 48/915 264/102 |
| 3,520,964 | A * | 7/1970 | Metz, Jr. | B29C 48/914 425/384 |
| 3,930,923 | A * | 1/1976 | Elliott | B29C 48/08 156/244.23 |
| 4,111,625 | A * | 9/1978 | Remmington | B29C 48/916 425/445 |
| 4,988,471 | A * | 1/1991 | Millevoi | B29C 48/917 425/224 |
| 6,168,412 | B1 * | 1/2001 | Kometani | B29C 48/272 425/224 |
| 6,767,500 | B2 * | 7/2004 | Yamazaki | B29C 41/26 425/224 |
| 2016/0336569 | A1 | 11/2016 | Mizuno et al. | |
| 2018/0036930 | A1 | 2/2018 | Ichinomiya et al. | |

FOREIGN PATENT DOCUMENTS

| | | | |
|---|---|---|---|
| CN | 101341194 | 1/2009 | |
| CN | 105916657 | 8/2016 | |
| CN | 206085395 | 4/2017 | |
| DE | 1 504 464 | 9/1969 | |
| DE | 1 704 720 | 3/1972 | |
| DE | 69 44 496 | 4/1972 | |
| DE | 3215273 | 10/1983 | |
| DE | 102008031834 | 1/2010 | |
| DE | 102011013539 | 9/2012 | |
| EP | 0 160 551 | 11/1985 | |
| EP | 0 378 279 | 11/1995 | |
| FR | 2505252 A1 * | 11/1982 | |
| FR | 2698580 A1 * | 6/1994 | ......... B29C 47/8855 |
| GB | 574621 | 1/1946 | |
| GB | 1064272 | 4/1967 | |
| JP | H11188776 | 7/1999 | |
| JP | 2017123268 | 7/2017 | |
| NL | 1011404 C2 * | 8/2000 | ......... B29C 47/0021 |
| WO | 99/65093 | 12/1999 | |
| WO | 2008/016174 | 2/2008 | |
| WO | 2009/044906 | 4/2009 | |
| WO | 2012/062011 | 5/2012 | |
| WO | 2012/138398 | 10/2012 | |
| WO | 2016/125526 | 8/2016 | |
| WO | 2019/116600 | 6/2019 | |

OTHER PUBLICATIONS

Notification of the First Office Action for Chinese Application No. 202010692413.6, 11 pages, dated Feb. 15, 2022.

* cited by examiner

METHOD AND DEVICE FOR PRODUCING A MELT AND/OR PLASTIC FILM

This application is the U.S. claims priority to DE Patent Application No. 10 2019 119 505.5 filed 18 Jul. 2019, the entire contents of each of which are hereby incorporated by reference.

The invention relates to a method and an apparatus for producing a melt and/or plastic film according to the preamble of claim 1 and claim 10.

In the production of thermoplastic flat films, a pre-film is usually first extruded through a slot die and immediately thereafter reaches a cooling roller and solidifies there. The overall structure is often such that at least part of the height of the cooling roller used is arranged to rotate in a cooling bath. The pre-film extruded from the slot die strikes the roller jacket of the cooling roller at a so-called contact line running parallel to the rotational axis of the cooling roller. In order to ensure a good transition, i.e. uniform contact, between the prefilm and the cooling roll, if possible without any inclusions, an electrostatic application unit (for example, pinning electrodes) or an air knife pressing the pre-film against the roller jacket can be used. However, all other known application methods are also suitable in principle, for example the use of a so-called "toch roll", a smoothing unit, a rolling mill, etc. Refer to known devices in this regard.

It should also be mentioned that in some processes electrode pinning (e-pinning) is not possible, for example.

If there is a cooling bath, in the context of the present application this is generally a cooling medium, that is, it is generally a cooling liquid or a liquid bath or liquid cooling bath, in order to cool the melt or the pre-film appropriately so that it can solidify. Therefore, the cooling fluid does not necessarily have to be water. In principle, other media can also be used, or even a cooling bath to which other media have been added. Thus, it is often said that the film crystallises or solidifies.

The aforementioned film is a so-called cast film which has a viscous, gel-like structure. In this respect, in the following sometimes the terms "melt" or "melt film" are used for short in the following instead of "pre-film" or "cast film". If it is a solidified film, this is also called a plastic film. A solidified film is often called a crystallised film. The term "solidification" is thus defined as a function of the polymer used.

In the case of semi-crystalline plastics (PE, PP, etc.), the term "solidification" can be used if the temperature in the film reaches a value at which the cooling of the melt has completely passed through the exothermic crystallization peak.

In the case of amorphous plastics, the film solidifies when the temperature drops below the glass transition temperature. In both of the aforesaid cases, as a rule the temperature is measured using DSC, that is, so-called "differential scanning calorimetry", i.e., so-called dynamic difference calorimetry.

The film solidified on the cooling roller is then usually fed via a plurality of deflection rollers under heat treatment to an actual stretching system in which the film can then be stretched, for example in the longitudinal direction and then in the transverse direction (or vice versa) or simultaneously in the longitudinal and transverse directions in order then, at the end of the stretching system, to be wound at a winding station, usually after passing through an annealing or post-treatment zone.

For the production of stretched membrane films for filtration, desalination, but also as separator films/barrier films for accumulators (such as lithium-ion accumulators, lithium-polymer accumulators, or, for example, also for lead acid batteries) made of polymers such as polypropylene (PP), polyethylene (PE), high density polyethylene (HDPE), and powdered UHMWPE (ultra high molecular weight PE), to form the pores prior to stretching the polymer must be homogeneously mixed, heated, and plasticised with a plasticiser (also referred to hereinafter as a solvent, i.e. as a dissolving agent or softening agent, and can also contain e.g. paraffin oil, etc.). The homogeneously incorporated plasticiser ensures that free spaces form in the polymer that lead to pore formation during subsequent stretching and when the plasticiser is washed out or evaporated. The goal is to distribute the plasticiser in an extruder so homogeneously and finely in the polymer to be melted/molten that the most and finest pores possible are created during stretching and when the plasticiser is washed out or evaporated.

As a standard, co-rotating twin screw extruders are used to which the polymer with the plasticiser, that is, the dissolving agent, are fed in a previously homogeneously mixed suspension (slurry). The components are often fed individually to the twin-screw extruder due to the simplified handling. When the components are added individually to the extruder, homogeneous mixing places high demands on the mixing quality of the extruders. Homogeneous mixing results can be achieved primarily through long dwell times, large mixing volumes, and high speeds. Only limited speeds are possible since only limited energy can be dissipated through the tempered cylinder jacket when the speed increases due to the heat of friction added. The output is further reduced especially when using UHMWPE with a high molecular weight greater than approx. 600,000 g/mol. If the plasticiser, i.e. the dissolving agent, is flammable, the processing temperature window shifts further downward due to explosion prevention measures, so that the maximum possible speed must be reduced again, which leads to a reduction in output due to poorer homogenizing performance. In order to achieve the outputs required in the market, twin screw extruders with relatively long processing lengths of 50-70 L/D must be used (L/D=ratio of the screw length to screw diameter).

Battery separator films and methods for producing them are known in principle, for example also from WO 2008/016174 A1.

It is also known, for example, from US 2018/0036930 A1, that the plasticisers included in the manufacture of such battery separator films are also used in the plastic material.

EP 0 378 279 B1 discloses a process for producing microporous films made of ultra-high molecular weight polyethylene. A film is to be formed from a homogeneous solution of the aforesaid polyethylene and in doing so the dissolving agent is to be removed from the film. For this purpose, an evaporable dissolving agent with a certain viscosity not exceeding an upper limit is used, so that the dissolving agent can evaporate from the film at a temperature below the solution temperature of the polyethylene. The film is then stretched, specifically below the melting point of UHMWPE.

In this regard, refer also to EP 0 160 551 A, having comparable content.

Furthermore, refer also to WO 99/65093, which describes the similar process according to which the film comprising polyethylene additionally contains an evaporable dissolving agent which is removed before the film is stretched.

Finally, refer also to WO 2012/138398 A1, which also concerns the production of a battery film, starting from a thermoplastic polymer in an evaporable dissolving agent contained therein, which is removed from the film before it is stretched.

When producing such films comprising a mixture with at least one polymer and at least one plasticiser (a so-called solvent or dissolving agent), however, it is found again and again that the films finally produced do not always have the desired high film quality.

Thus it has been found that there are differences in the surface morphology of the finally produced plastic film. In some cases, defective areas occur that lead to the open-cell porosity and thus the roughness of the plastic film being greater locally within a defect area. A good film, as it should be used in particular as a battery separator film (also called BSF film for short) for accumulators or batteries such as lithium-ion accumulators or batteries, should have a uniform open cell structure and thus a uniform cell network with as few impermeable areas and knots as possible.

During the production of the corresponding plastic film explained in the foregoing, it has also been found that outside of the defects that occur, the network structure is only less pronounced and therefore denser areas are visible. In contrast, a strongly developed, open-cell network is visible within a defect in the plastic film.

Figures 10A, 10B:
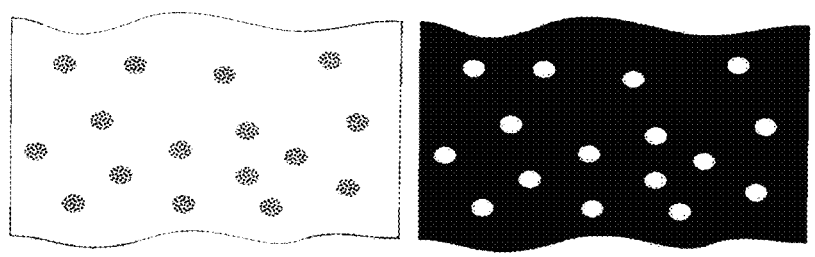

In summary, it can be stated that a typical visual appearance of such a plastic film provided with defect areas has a higher surface roughness and a lower gloss at the defect areas, combined with higher translucence at these defect areas. This is shown systematically, for example, with reference to FIGS. 10*a* and 10*b*, the two figures merely showing a segment of a plastic film in plan view. The defect areas are shown as points in FIG. 10*a* and FIG. 10*b*. In the illustration according to FIG. 10*a*, these points define a higher surface roughness and thus result in a lower gloss at the defect areas. The depiction according to FIG. 10*b* illustrates that translucence is higher at the corresponding defect areas.

Figure 11:
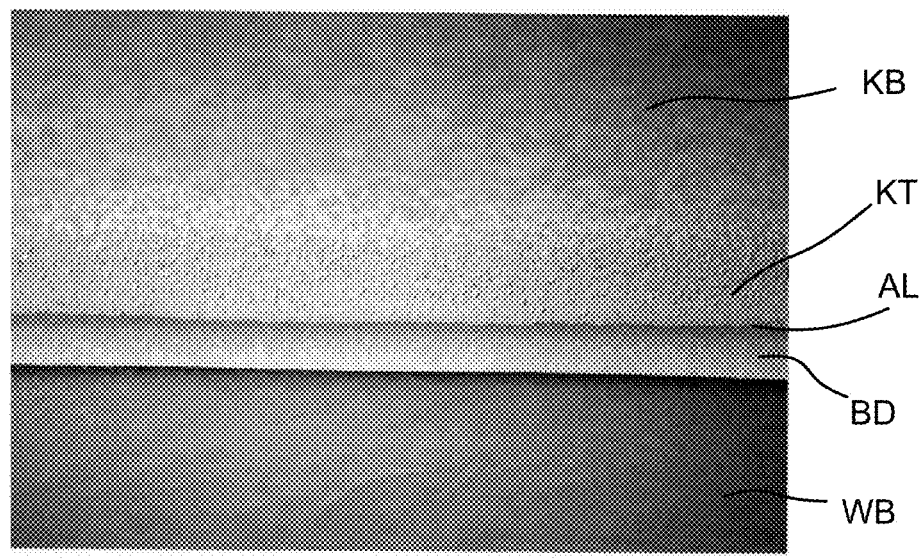

Finally, a photographic detail representation is provided in FIG. 11 and provides a plan view of a melt film. In the upper part of the photograph, the formation of condensate KB can be seen, and it merges in the direction of contact line AL on the roller into condensate drops KT which are then pressed into the melt film after reaching the contact line on the cooling roller, wherein it can be seen that the aforesaid defects are visible in the centre region of the photograph in FIG. 10 in this region BD of the impressions. The water bath WB is below this and is irrelevant for the explanation and development of the condensate within the context of the invention.

It is therefore an object of the present invention to provide an improved method and an improved device which ensure that, also and in particular in the production of plastic films which can be produced from a mixture of at least one polymer and at least one plasticiser (that is, a dissolving agent, hereinafter also sometimes referred to as solvent) of any type (for example in the form of a dissolving agent or for example also in the form of a mineral oil or the like), a higher quality can be achieved while preventing or reducing defect areas that occur according to the prior art.

The object is achieved with respect to the method according to the features specified in claim 1 and with respect to the device according to the features specified in claim 10. Advantageous embodiments of the invention are specified in the dependent claims.

In the context of the invention, it has ultimately been found that the aforesaid defect areas on the battery separator film are due to the effects of condensation, which lead to adverse effects on the plastic film. This is particularly important in the manufacture of battery separator films for lithium-ion batteries (accumulators).

The invention is based on the understanding that condensate defects already occur when the pre-film or melt film is transferred from the slot die to a cooling station (usually in the form of a cooling roller) and that condensate forms in the air and on the cooling roller, the condensate droplets that form or separate here then ultimately being pressed into the melt and leading to the aforesaid undesirable defects in the film to be stretched.

Systematic investigations carried out within the context of the invention have demonstrated that condensate defects with the described adverse effects can occur above all if the following conditions are met:

1. A melt or a cast film or an already stretched film is cooled by being placed on one or more cooling rolls;
2. The melt or film comprises a mixture of at least one polymer and at least one plasticiser (wherein any agent can be used as plasticiser, that is, dissolving agent or solvent, but also, for example, mineral oil or the like, there are no restrictions or limitations in this regard);
3. The melt or film temperature is higher than the flash point of the dissolving agent (solvent);
4. The surface temperature of the melt or film is high enough to allow a local change in the structure due to contact with the liquid dissolving agent (this effect typically occurs when the plastic material is still completely or partially in the melt state, i.e. in the phase in which, e.g., a pre-film or melt film is transferred from a slot die or extruder die to a cooling roller, the pre-film then not yet having solidified.

Under these conditions, before the melt or film is placed on the cooling roller, a condensate forms around the melt or film and in the atmosphere surrounding the melt or film and comprises or consists of dissolving agent or solvent escaping from the melt or film. This condensate can then be "locked in" between the melt or the film and the roller at the contact line of the melt or film on the roller, ultimately resulting in the aforesaid defects on the film surface.

For example, on biaxially stretched film surfaces, these defects become slight indentations which can be identified by locally higher translucence and locally higher surface roughness, as has already been explained with reference to FIGS. 10*a* and 10*b*. Depending on the process control, the aforesaid defects can occur on one or both sides of the film, that is, on the plastic film.

Within the context of the invention, a solution is now proposed for how an improvement in the plastic film to be produced can be achieved. In particular, within the context of the invention, above all an improvement in uniformity is achieved in a battery separator film (BSF film) (as used, for example, for batteries or accumulators, in particular lithium batteries), in the production of which a plasticiser, that is, a dissolving agent or solvent or the like is used. The increased film quality achieved in the context of the invention ultimately leads to fewer defective products and to an increase in productivity.

Since the aforementioned condensate formation, which adversely affects the films, occurs or can occur especially in the production of plastic films containing dissolving agents, the invention proposes above all implementing process management that is improved compared to the prior art and/or providing a device and/or an arrangement to avoid condensate defects. In principle, the aforesaid condensate defects can also occur in a stretching stage, even in a longitudinal stretching stage, but generally do not pose any problem or pose only a minor problem in that case because in these stretching stages the surface temperature of the film is generally not as high and/or temperature differences between the film temperature and the roller temperature (cooling roller) are minor enough that a corresponding formation of condensate does not occur or no longer occurs to a degree that is relevant.

In summary, it can be stated that the described condensate defects are avoided by the measures according to the invention and thereby the film quality, i.e. in particular the film's visual appearance and properties, are improved.

Figure 2:
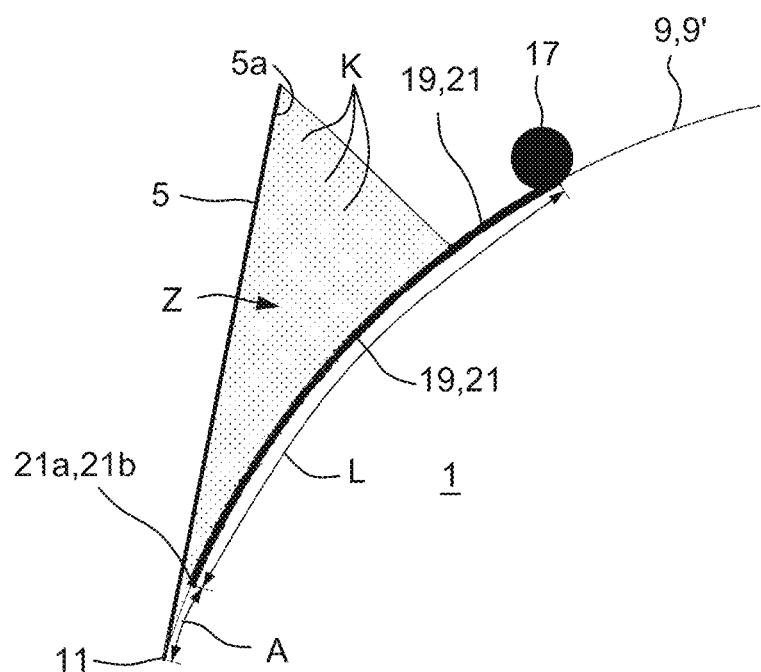
Figure 3:
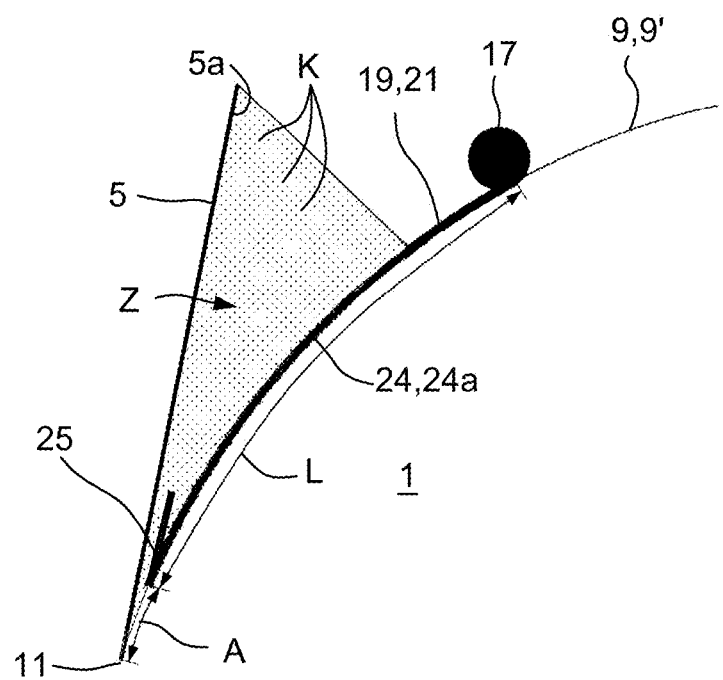
Figure 4:
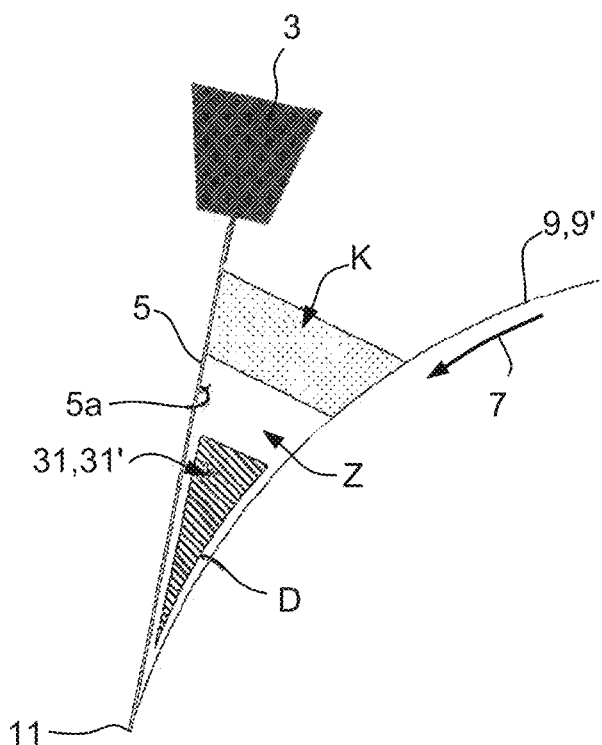
Figure 5:
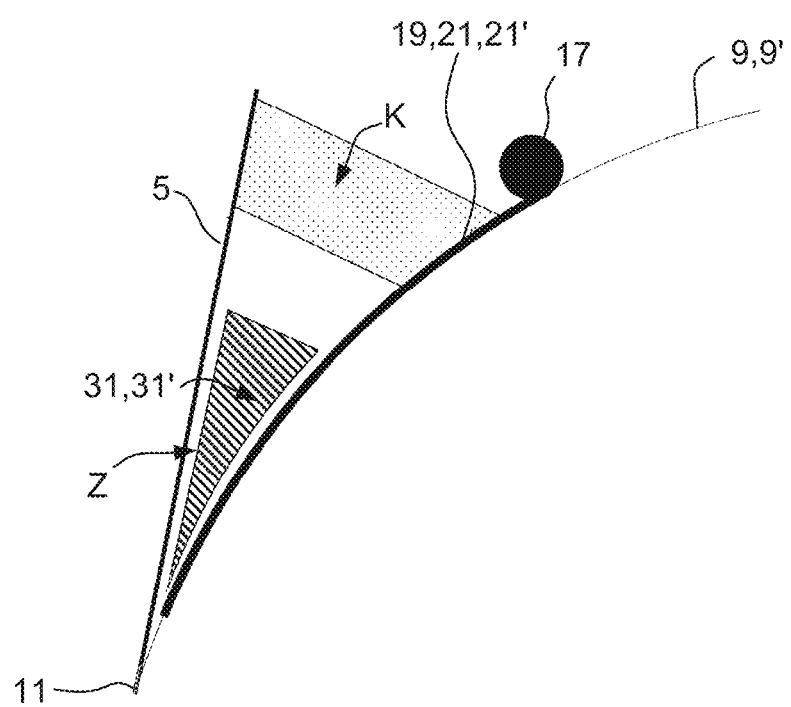
Figure 6A:
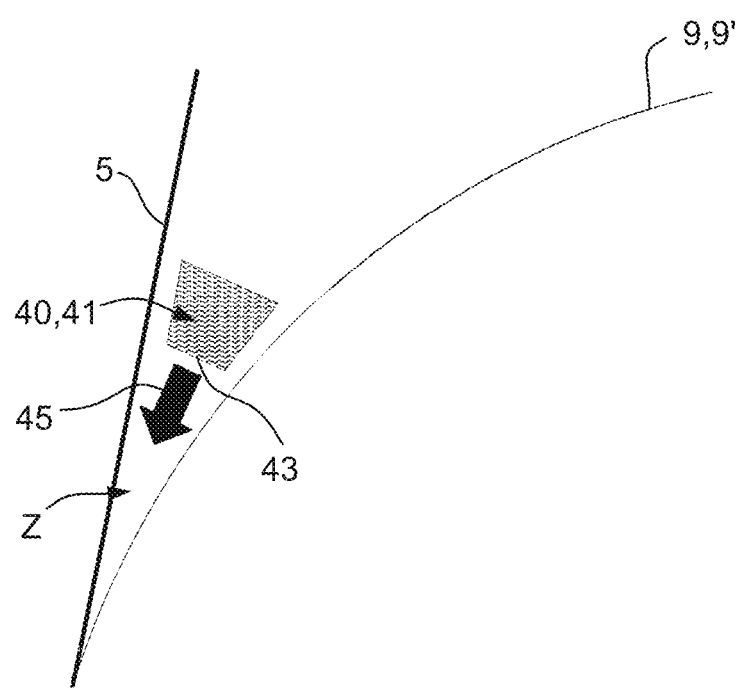
Figure 6B:
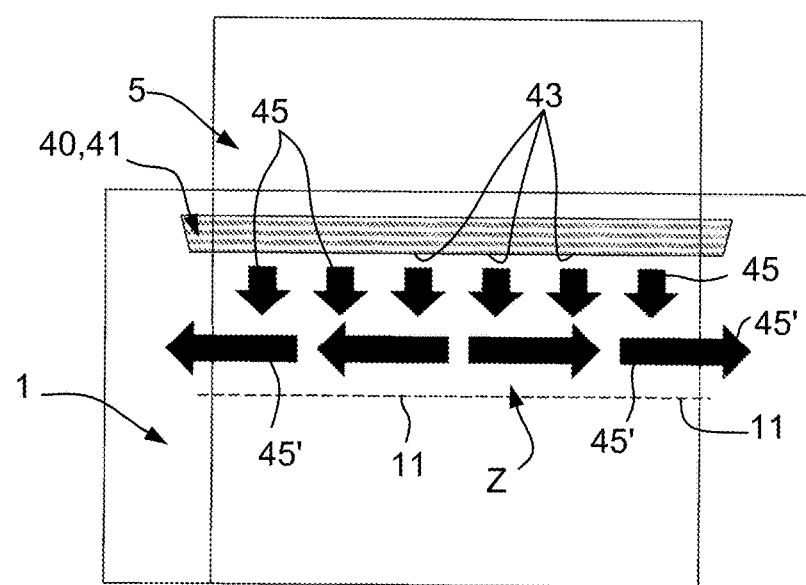
Figure 7A:
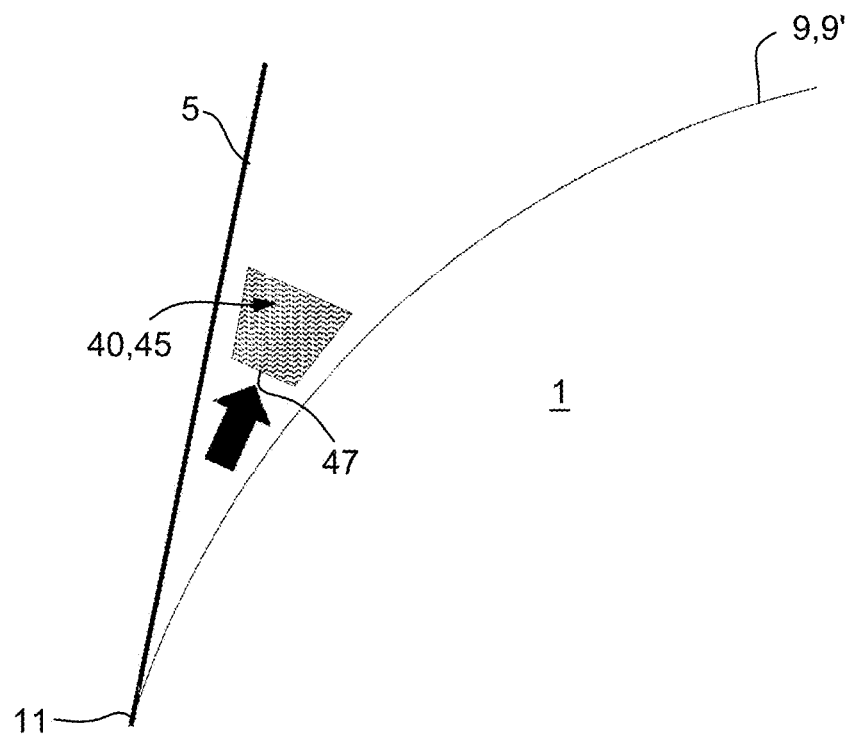
Figure 7B:
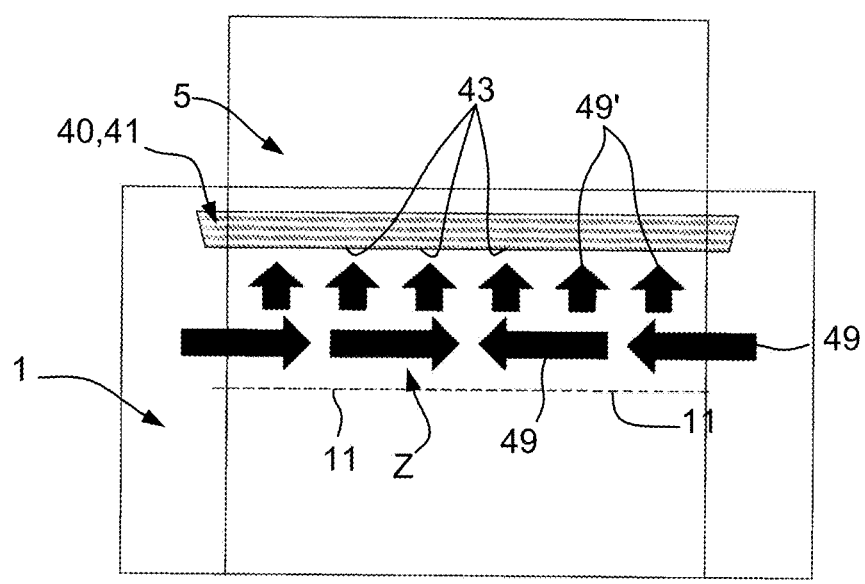
Figure 8:
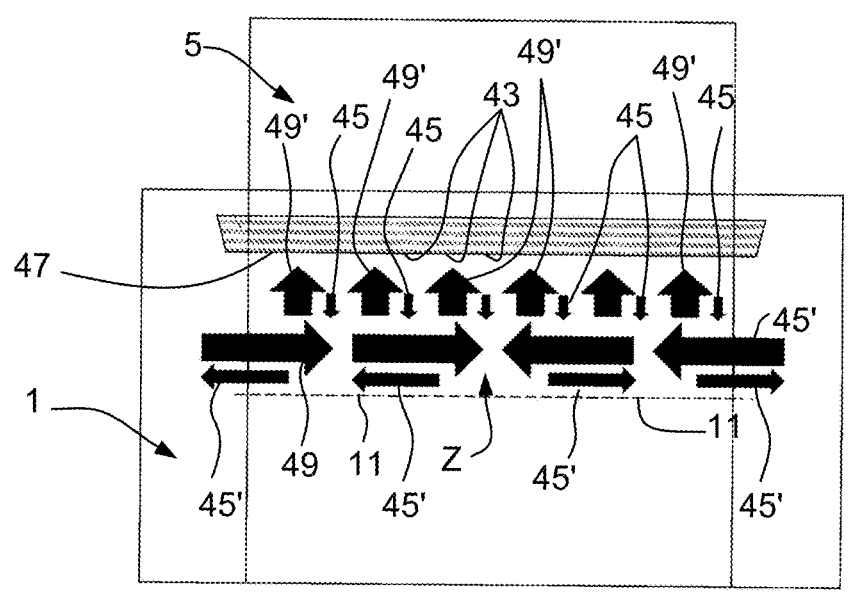
Figure 9:
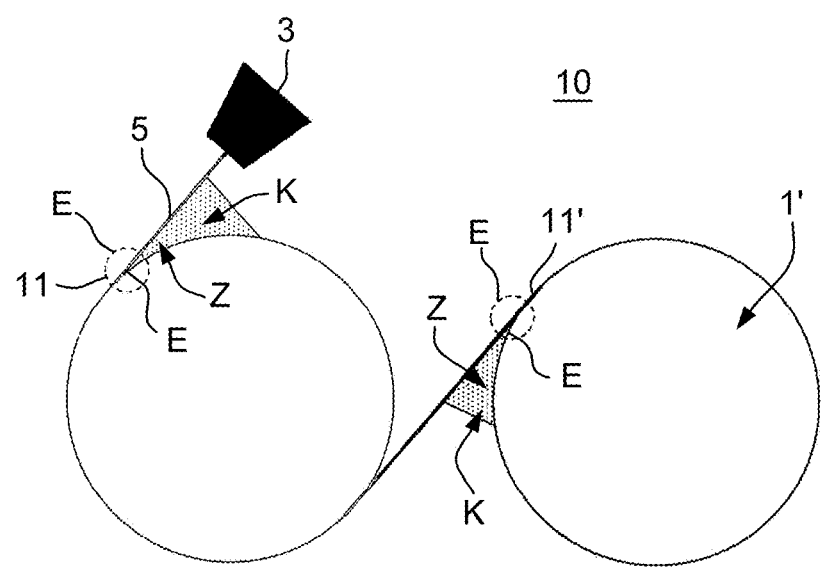

The invention will be explained in more detail in the following and referring to exemplary embodiments. In detail:

FIG. 1: is a schematic side view of an extruder or flat die delivering a melt film onto a cooling roller;

FIG. 2: is a schematic side view of an exemplary embodiment according to the invention using a cover or shielding mat;

FIG. 3: is a schematic side view of a modified exemplary embodiment using a solid cover device in the form of a cover wall;

FIG. 4: depicts a further exemplary embodiment using a heating device to prevent the formation of condensate or to prevent condensate from precipitating;

FIG. 5: depicts a further exemplary embodiment using a heating device as described for FIG. 4 and a cover device as explained for FIGS. 2 and 3;

FIG. 6a: is an end-face view parallel to the rotational axis of the cooling roller using an air circulation device, in the form of a blowing device, arranged in the intermediate region;

FIG. 6b: is a corresponding plan view of the exemplary embodiment according to FIG. 6a, rotated by 90.degree.;

FIG. 7a: is an end-face view parallel to the rotational axis of the cooling roller using an air circulation device, in the form of a suction device, arranged in the intermediate region;

FIG. 7b: is a corresponding plan view of the exemplary embodiment according to FIG. 7a, rotated by 90.degree.;

FIG. 8: depicts a further exemplary embodiment in which the blowing devices described for FIGS. 6a and 6b are shown as an embodiment combined with the suction device described for FIGS. 7a and 7b;

FIG. 9: is a schematic side view of a further exemplary embodiment, wherein a subsequent second roller or cooling roller is provided in addition to a first cooling roller;

FIG. 10a: is a partial schematic plan view of a film, with defect areas, that was produced according to the prior art;

FIG. 10b: provides a depiction comparable to FIG. 10a, but for illustrating greater translucency at the defect areas; and, FIG. 11: is a partial photographic depiction of the underside of the melt film prior in front of and after the contact line on a cooling roller with the condensate introduced into the melt film.

Refer to FIG. 1, which is a schematic side view of a cooling roller 1 to which a melt or a melt film 5 output from a flat slot die, slot die, or extruder die 3 is transferred.

The cooling roller 1 is usually rotated continuously in a rotational direction 7. The roller jacket 9 is tempered to a desired roller jacket temperature $T_R$. Normally at least part of the height of the cooling roller 1 is in a water basin, but this is not mandatory. Instead of the aforementioned water basin, a cooling basin filled with a suitable cooling medium, usually a cooling liquid, is generally used. The cooling liquid can comprise water, solvent, or another agent or can include water, solvent, or other agents. In principle, any coolant that is suitable for cooling the melt can be used.

As a rule, the so-called contact line 11, at which the melt film 5 emerging from the flat slot die or extruder die 3 first makes contact with the roller jacket 9, is disposed in the cooling basin above the coolant or water surface when the cooling roller 1 is arranged.

The illustration according to FIG. 1 indicates that, especially in the production of plastic films using at least one polymer with at least one dissolving agent or plasticiser (solvent), a condensate K can form and then become somewhat "enclosed" between the melt film and the roller surface, so that it is deposited on the melt film underside 5a. In FIG. 1 the particularly critical region is identified with the reference symbol E; condensate may be pressed into the melt or film 5 in this region in particular. In order to avoid misunderstandings, it is again noted here that a solvent is ultimately a dissolving agent and the terms "solvent" and "dissolving agent" are therefore used interchangeably.

The intermediate space Z, which in cross-section tapers in a wedge shape in the direction of the contact line 11, is particularly important for the formation of condensate. It is primarily this region Z, shown in dash-dotted lines in FIG. 1 and delimited by the melt film 5 (or its underside 5a), the roller jacket 9 or generally the surface 9' of the roller jacket 9, and, limited to the rear open side, for example, by an imaginary surface area F, such that the rotational axis 8 of the cooling roller 1, on the one hand, and the centre longitudinal plane in the longitudinal direction of the extruder slot die 3, lies in this plane F. Different from the surface area F thus defined in FIG. 1, the sub-region Z opposing the contact line 11 can also be delimited, for example, by an imaginary plane or surface area F1 which runs, for example, transverse or perpendicular to the melt film plane and marks the region in which the formation of condensate sharply decreases or has sharply decreased. What is critical in the context of the invention is the region in which the intermediate space becomes increasingly narrow and then terminates at the contact line 11.

The application sometimes refers not only to a slot die but also to an extruder die or flat slot die. In general, the scope of the invention is a die. In this context, a flat slot die is preferably used, and, as stated, can also be designed as a slot die or extruder die, but need not be.

1. Use of a Device and/or Arrangement to Prevent Condensate Defects

Improvements over the prior art can be achieved by one or more of the following measures or devices.

It has been found that the condensate defects can be prevented by implementing at least one of the following measures.

FIG. 2 illustrates that an improvement can be achieved by using a corresponding cover device 19 for the corresponding section on the surface 9', that is, on the roller jacket 9 of the cooling roller 1. FIG. 2 illustrates an enlarged partial region from FIG. 1 which primarily describes the intermediate space Z that tapers in a wedge shape in the rotational direction and in which the condensate formation and condensate separation takes place on the roller surface itself.

For this purpose, a cover device 19 is provided in the following exemplary embodiment in the form of a nonwoven fabric or cover mat 21. Although a nonwoven material 21 is sometimes referenced hereinafter, ultimately this is generally only a mat or cover mat 21, that is, a kind of cover 21 or covering 21, in particular in the form of a textile cover 21 which can comprise a wide variety of materials, for example from natural fibres, man-made fibres, non-textile raw materials, nonwovens, felts, etc., which are processed to form a sheet-like structure and or comprise such a structure or at least have such a shape.

In general, it is already noted at this point that the cover does not have to comprise only one material or one material layer, but can also be multi-layer, that is, it can comprise several layers. In this case, materials can also be used which can remove the condensate particularly well, for example using the capillary effect inherent in the material or using an appropriate coating. In this case, materials are preferred which can produce a capillary effect in order to lead the separated condensate away from the high-density region into a region having a lower condensate density and disposed outside the problem zone. For better understanding, refer to FIG. 2, which has a partial circumference of a cooling roller 1 with a roller jacket 9 visible according to the depiction of the partial circumference, and the flat slot die or extruder die 3 illustrated schematically in FIG. 1 and from which the melt film 5 in question is delivered and runs along the contact lines 11 perpendicular to the plane of the drawing and thus parallel to the cooling roller 1 or the rotational axis thereof.

It can be seen from this that the in particular textile cover is provided, attached, and held in the intermediate region between the melt film 5 delivered by the flat slot die or extruder die 3 and the intermediate region Z relevant to the formation of condensate such that the mat 21 or cover 21 is held via the usual holding device 17 running parallel to the cooling roller 1 and is positioned in a corresponding length L on the surface 9' of the roller jacket 9.

This in particular textile-like cover mat 21 or cover 21 in general is held in place, as shown according to FIG. 3, by means of a holding device 17 which as a rule extends across the cooling roller in the longitudinal direction parallel to the rotational axis, at least in the vicinity of the roller jacket. The cover mat 21 is thus not held such that it rotates with the cooling roller 1. In other words, the cooling roller 1 rotates beneath the non-rotating textile cover 21.

In order for this cover mat 21, that is, what is sometimes called the nonwoven fabric 21, to have the desired effect, the cover mat or cover 21 must be placed between the melt film 5 and the cooling roller 1 such that the planar covering 21 or nonwoven fabric 21 terminates in front of the contact line 11 on the roller jacket 9.

Furthermore, the nonwoven fabric or the cover 21 must terminate in the rotational direction 7 in front of the contact line 11 of the melt film 5, specifically at the least possible distance. This distance A should be as small as possible, that is, as small as possible without contacting the melt 5. This depends, inter alia, on the roller diameter and also, for example, on the thickness of the nonwoven fabric. Very generally, this distance should therefore be greater than 0 mm, in particular, for example, greater than 0.5 mm, 1 mm, 1.25 mm, 1.5 mm, 1.75 mm, 2 mm, 2.5 mm, in particular greater than 5 mm, 7.5 mm, 10 mm, 12.5 mm, 15 mm, 17.5 mm, 20 mm, 22.5 mm, and greater than 25 mm. Likewise, as mentioned, this distance can or should preferably be less than 40 mm, in particular less than 35 mm, 30 mm, 25 mm, 20 mm, 15 mm, and less than 10 mm. Even smaller values are preferred, so that this distance A is, for example, less than 7.5 mm, 5 mm, 4 mm, 3 mm, 2 mm, 1.5 mm, 1.25 mm, 1.0 mm, 0.75 mm, 0.5 mm, or 0.25 mm.

In principle the stated values apply regardless of the diameter of the cooling roller or chilling roller. Cooling rollers with a diameter between 100 mm and 5000 mm, that is, preferably between 200 mm and 50,000 mm, are often used. Cooling roller diameters of around 300 mm have proved to be typical diameter sizes.

When using a cover device 19 of the type described, also referred to for short as a covering 21 identified as a nonwoven fabric 21, care should be taken to ensure that no folds occur. The web end 21a of the cover mat or cover 21 trailing in the rotational direction 7 of the cooling roller 1 must not have any contact with the melt film 5. Therefore, the aforementioned sufficient distance A to the melt or to the contact line of the melt on the roller jacket 9 must be maintained here. The cut edge 21b facing the melt film 5 at the so-called web end 21a of the cover mat 21 should therefore be of high quality so that the condensate absorbed by the cover mat or nonwoven fabric 21 does not lead to the formation of drops on the cover mat or nonwoven fabric edge 21c, that is, at the web end 21a of the cover mat 21, wherein the web end 21a simultaneously forms the cut edge 21b in the aforesaid exemplary embodiment. Such a high quality of the cut edge 21b means that this cut edge 21b should be as smooth and free of fibres as possible. This is because protruding or projecting fibres would collect dissolving agent released by the cover or the nonwoven fabric due to gravity, creating a drop locally that could drip onto the roller periodically or at irregular intervals. From there the drops can reach the melt. A particularly smooth, i.e. clean, cut edge that is free of fibres, always soft, and/or sealed can instead ensure a uniform release of solvent along the cut edge.

It has also proven advantageous when this cut edge 21b is produced as follows, for example:
by cutting using a knife,
by cutting using scissors or guillotine shears, or,
by cutting using a laser (laser cutting) and, for example,
by punching using a suitable tool.

Since a uniform cutting edge 21b should therefore be distinguished by the fact that no fibre ends protrude, laser cutting is preferably carried out to produce a uniform cutting edge 21b free of fibres.

The terms chosen above such as cover mat, cover, covering, and generally nonwoven fabric mean that there is no restriction with regard to a specific choice of material or material design or structure, etc.

The selected terms such as cover mat, cover, covering, and nonwoven fabric can be understood to mean, for example, the following materials:
Woven fabric
Paper
Leather
Nonwoven/nonwoven fabric
Neoprene/imitation neoprene
Foam rubber
Membranes (including separator films as are to be produced in the context of the invention itself)
Artificial leather
Foams
Composite materials The materials can comprise polyester, cellulose, polypropylene, polyester/polyamide, polyether sulfone/polyamide, cellulose/polyester, paper, rubber or foam rubber (foam), imitation neoprene (fabric) and/or synthetic leather (as known and sold under the trade name Alcantara®, for example), and the like.

In very general terms, the cover device 19 explained in the foregoing, here in the form of a type of covering or nonwoven fabric 21, can have one or more of the following properties, specifically:

Flexible

Soft

Wrinkle-free

Either porous or non-porous

Liquid or moisture permeable or non-liquid or non-moisture permeable

Textile or fabric or textile/fabric-like

This makes it possible to ensure that the entire surface of the cover device 19 in the form of the cover mat 21 rests on the surface 9' of the rotating cooling roller 1 but does not rotate with it.

It should also be noted that the shielding mat (21) or in general the cover device (19) has or can have a thickness preferably between 10 μm to 4 mm and/or a mass per unit area preferably between 30 g/m$^2$ and 100 g/m$^2$. In general, therefore, the shielding mat can have a thickness of more than 50 μm, 100 μm, 200 μm, 300 μm, 400 μm, 500 μm, 600 μm, 700 μm, 800 μm, 900 μm, even with more than 1 mm, 1.25 mm, 1.5 mm, or 1.75 mm. Conversely, the thickness of the shielding mat (21) or cover device (19) can have a thickness that is less than 1.75 mm, in particular less than 1.5 mm, 1.25 mm, or 1 mm. It is even possible to have thicknesses less than 900 μm or 800 μm, 700 μm, 600 μm, 500 μm, 400 μm, 300 μm, and less than 200 μm, less than 100 μm, or even less than 50 μm.

2. Another Exemplary Embodiment to Prevent Separation of Condensate

A further exemplary embodiment is described below with reference to FIG. 3 and is fundamentally similar to the exemplary embodiment according to FIG. 2.

In the variant according to FIG. 3, as well, a cover device 19 in the form of a shielding mat 21 is provided on the roller surface 9' of the cooling roller 1 and is placed at least in the intermediate region Z on the surface 9' of the cooling roller and thereby reaches as close as possible to the contact line 11 at which the melt or the melt film 5 is placed on the surface 9' of the cooling roll 1.

In this exemplary embodiment, the aforementioned cover or shielding mat 21 also prevents condensate from precipitating on the roller 1 or roller surface 1' (due to the high temperatures of the melt, as a rule no condensate will precipitate directly on the melt itself).

The cover device 19 here is designed in the form of a shielding or cover wall 21 and preferably comprises a non-porous material, i.e. in this exemplary embodiment preferably comprises a solid material such as metal sheet, glass, plastic, etc., that is installed securely. In other words, such a solid cover can be mounted and held as close as possible above the roller surface 9' by a suitable holding structure, preferably concentric with the rotational axis 8 of the roller 1.

However, such a described more solid shielding or cover wall 21' does not necessarily have to be arranged and held at a distance above the roller jacket, but can also be held by the roller jacket rotating beneath it. In this case, the cover device 19, for example of the shielding or covering wall 21, would also rest on the roller surface. This does not damage the roller surface or top. Therefore FIG. 3 illustrates such a variant, in which the cover or shielding device 19 rests on the roller jacket but does not rotate with the roller itself.

It would also be possible for a support structure that does not rotate with the cooling roller to be provided and anchored in place in the end-face region of the roller, for example, in doing so carrying and holding a shielding film stretched between these end-face support devices. This could be a tent-like structure which is then held and clamped at a short distance above the roller surface 9' so that the actual shielding cloth or the shielding film itself preferably does not touch the roller surface 9'.

This is also finally understood to be a solid cover wall 21' in the context of the description, since the clamping of the shielding film creates a more or less stable structure or support structure.

Using such a cover wall 21' made of preferably non-porous material, which is therefore preferably also not perforated and thus is water or cooling medium-tight or impermeable (generally impermeable for the precipitating condensate), the access of the condensate to the roller surface can be prevented in a purely physical manner.

In order to prevent the condensate from running in an uncontrolled manner into the region between the roller and the melt, in this variant according to FIG. 3 a drain device 24 is preferably also provided and can be embodied, for example, in a V-shape in cross section according to FIG. 3 to form a strip 25, the vertical component of which rises from the cover wall 21', preferably at its lower end, that is, at the lowest point, for a certain length in order thereby to form a channel-like drainage region 24a. As a result of this, due to gravity, the condensate precipitating on the top of the cover wall 21' can flow down into this channel-like drainage region 24a, and then possibly be diverted to the outside, again using only gravity (that is, in the direction of the two opposing end faces of the roller, and thus out of the region below the melt). The removal of the condensate does not necessarily have to be done solely using gravity, but can also be supported using suction at one or both opposing sides of the drainage channel and thus at the opposing sides of the melt edge or, above all, may be accomplished only by a suction device. The drainage channel itself can be carried out, for example, by reshaping the lower edge at a certain angle, the angle between the surface of the cooling spaces and the melt film being formed such that the end of the drainage leg does not touch the underside of the melt film.

In the exemplary embodiment illustrated in FIG. 3, a cover wall or shielding wall 21 has been used as the cover device 19 and comprises solid or nearly solid material and is preferably arranged, mounted, and held a short distance from the roller surface 9' rotating beneath it. In this case, the strip 25 is also preferably formed from the same preferably solid material, forming the channel-like drainage region 24a.

However, it should be noted at this point that even in the case of a cover device 19 in the form of a cover mat 21 (as described with reference to FIG. 2), it can also be equipped with a comparable drainage device 24. In this case, as well, a strip-shaped elevation 25 can be provided at the lower end or, if possible, at the lowest point of the shielding mat 21, specifically forming a drainage device 24, i.e., a channel-like drainage region 24a. If a shielding mat 21 is used, the strip 25 can, if appropriate, also be formed from the same material, if appropriate with the incorporation of reinforcing material, so that the strip 25 is disposed in the intermediate space Z in a dimensionally stable manner without touching the underside 5a of the melt film 5. Likewise, however, for example when using certain materials, the strip 25 can also be designed accordingly, for example can be cast on, without using dimensionally stable holding strips in order to form and hold the wall-like strip 25 in a positionally stable and contact-free manner with respect to the melt film 5, as explained.

Preferably alternatively (but possibly also in addition to the described drainage device 24), an absorbent material which is placed flat or mat-like onto the explained solid cover 21 could also be used. Due to capillary action, the condensate could move upward in the absorbent material against the rotational direction of the cooling roller, and thus against the take-off direction for the melt film, and can be suctioned off or heated there. The underlying principle for this is that the condensate liquid is transported by capillary action from the moist region into the dry region of the absorbent mat-like material placed on the cover. However, if this absorbent mat is more or less uniformly moist, the capillary effect could cease. Therefore, a "stable gradient" would have to be created in the moisture region in the placed absorbent mat so that the transport of moisture from the lower end of the solid cover 21 or the layer of absorbent material or layer of material placed thereon does not cease.

The condensate collected or disposed on the absorbent material can, generally speaking, vaporise or evaporate in order to be conducted out of the condensation region Z that runs in the drainage direction in an increasing wedge shape. Since there is a large surface available for the applied absorbent material (because the absorbent material can consist of a nonwoven fabric, a woven fabric, etc.), the removal and the evaporation process for the condensate can be sufficient for preventing condensate liquid from flowing downward and reaching the underside of the melt film. However, it would also be possible for an additional heating device to be provided adjacent to the absorbent material in order to accelerate and improve the process of evaporating the condensate deposited thereon.

3. Additional Device for Preventing Separation of Condensate

The following refers to FIG. 4, in which a solution according to the invention is explained using a further exemplary embodiment.

In the illustration according to FIG. 4, a heating element 31 that is wedge-shaped in the end-face view according to FIG. 4 and that preferably extends across the entire width of the roller 1, or at least the entire width of the melt or melt film 5, is provided in the intermediate region Z (that is, between the melt film 5, that runs between the outlet die 3 and the contact line 11 on the surface of the roller jacket 9 of the cooling or chilling roller 1, on the one hand, and the surface 9' of the cooling roller on the other hand). In this regard the following sometimes refers to a heating wedge 31'. In many cases, however, it is also sufficient if the wedge-shaped heating element 31 is only provided in part of the width of the melt film, for example, it extends only across 60% or more of the width. Since the heating element is preferably arranged in the centre of the film and preferably does not deviate from this central position by more than 20% or 10%, using a heating element 31 which only extends across 60% of the width of the film would result in only one outer edge strip of 20% on each side in which the corresponding heating element is not arranged immediately below.

Furthermore, a condensation region K is indicated schematically in FIG. 4. Different from the drawing, the condensation region K is not limited only to the region narrowly delimited in FIG. 4, but extends beyond the indicated boundary lines and its density decreases continuously towards the rear side of the intermediate space Z. FIG. 4 illustrates only by way of example that the rear so-called "boundary surface" F can also be defined differently than in the exemplary embodiment according to FIG. 1, since this is only intended to clarify to some extent where the intermediate space Z begins in the direction of its wedge-shaped end leading in the direction of rotation or can be described as relevant. In the exemplary embodiment shown in FIG. 4, this rear boundary surface F between the melt film 5 and the surface 9' (that is, the jacket 9' of the roller 9) is drawn such that an acute angle α is formed between the surface area F and the surface area of the melt film 5 or roller surface 9' or the tangent thereon. The exact end of this zone is not relevant to the invention. It should only be clarified that the intermediate space Z which tapers in a wedge shape in the direction of rotation of the cooling roller, especially in the region of its wedge-shaped tapering distance, is heated such that condensation is not thermodynamically possible there.

A corresponding heating wedge 31 can be held at the end faces of the roller by means of a stationary support structure.

By heating the environment in the critical region, it is possible to prevent condensation of the dissolving solution, plasticiser, etc., that is, of the generally referenced solvent. Heating via the heating wedge 31' shown in FIG. 4, that is, the wedge-shaped heating element 31, thus takes place in the aforesaid region Z between the melt and the roller before the melt film 5 is placed on the roller surface.

The temperature of the heating wedge 31' should be close to the current or melt temperature. Such temperatures are typically 160° C. to 200° C.

The distance from the heating wedge 31' to the melt or to the melt film 5 and to the roller 1 should be as small as possible. These distance values D should be in a range between 5 mm and 10 mm. Furthermore, the distance from the heating wedge 31' to the contact line 11 at which the melt film meets the cooling roller should also be as small as possible. The values for this should preferably be between 5 mm and 30 mm, that is, preferably more than 7.5 mm, 10 mm, 12.5 mm, 15 mm, 17.5 mm, 20 mm, 22.5 mm, or 25 mm. Likewise, the preferred values can be less than 27.5 mm, 25 mm, 22.5 mm, 20 mm, 17.5 mm, 15 mm, 12.5 mm, 10 mm, or less than 7.5 mm.

Under certain circumstances, a further improvement can also be brought about in that not only is the aforesaid heating device used, that is, the heating element 31, but additionally also the cover explained using FIG. 3, i.e., the cover mat or the nonwoven fabric 21, is used as explained for the exemplary embodiment according to FIG. 2 or a cover wall 21' is used as according to FIG. 3. This is illustrated schematically in FIG. 5 in the partial end face view transverse to the take-off direction of the melt.

The aforesaid heating device, for example with the aforesaid heating element 31, can be used not only on a mat-like cover 21 which is placed on the roller surface and is held more or less in place there even when the roller is rotating, but also in the aforesaid variant in which the cover device 19 comprises of a solid cover wall 21', regardless of whether an additional absorbent material layer or material repository 21" is provided and placed on this solid cover wall 21' or possibly on the shielding mat 21. Regardless of whether the cover comprises a stationary cover device 21' or only a cover 21 placed in a mat-like manner onto the roller surface, as explained the heating device can be designed such that the cover or cover device is ultimately heated such that due to the surface temperature no more condensate precipitates. The heating can be carried out using all suitable measures, using an appropriate heating device which runs parallel to the roller surface or preferably parallel to the rotational axis 8 of the roller surface 9' in the critical space Z which tapers in a wedge shape in the take-off direction, or else in that an appropriate heated one gaseous medium is blown through this space in order to increase the temperature of the cover.

Finally, the heating device 31 also ensures that the region in which the condensate K according to FIG. 4 occurs at its highest density decreases in depth or does not occur the closer one comes to the heating device 31, not only to the rear side (that is, against the rotational direction 7 of the cooling roller 1), but also in the direction of the heating device 31 or heating wedge 31'.

4. Another Exemplary Embodiment

FIG. 6a again illustrates the intermediate region Z between the melt film 5 and the roller surface 9' (that is, the roller jacket 9') in an end-face view, that is, perpendicular to the cooling roller 1 and its rotational axis 8.

FIG. 6b additionally provides a schematic plan view of the melt film 5 and the cooling roller 1 disposed beneath it.

In this exemplary embodiment, instead of the heating device 31 shown in FIGS. 4 and 5, which extends parallel to the roller axis or rotational axis 8 of the roller 1, a so-called air circulation device 40 is shown, in this case in the form of a blowing device 41, which can be embodied in a trapezoidal shape (but this is not critical). This blowing device 41 therefore again preferably extends at least across the entire width of the melt film 5, that is, preferably beyond the width of the melt film 5, and, similar to the heating device 31, is held and supported using a fixed support device provided at opposing end faces of the roller (not shown in greater detail in the figures).

Similar to the previous exemplary embodiment, however, the blowing device 41 can also be dimensioned from its transverse extension to the longitudinal direction of the film or to the take-off direction of the film such that its length is preferably only 60% or more of the width of the film or melt film. With a preferably centred or approximately centred arrangement (with a deviation of preferably less than 20% or 10% from this centred position), in this case, as well, only the two outer opposing edge strips of the film, each with a width of 20% or less, remain, below which the structural elements of the blowing device are not arranged directly.

In this case, the blowing device 41 can be supplied a gaseous medium, in particular air or dry air, from each opposing end face (wherein supplying gaseous medium via only one end face is generally sufficient or, for example, gaseous medium can also be supplied in a centre section so that the gaseous medium can flow from there in both opposing end face directions of the cooling roller), the blowing device 41 then having a continuous slit-shaped outlet nozzle in the direction of arrow 43 essentially across the entire width of the melt film outlet nozzles 43 or, for example, a continuous slit-shaped outlet nozzle 43. This allows the gaseous medium to escape, and it is blown into the space Z which increasingly tapers towards the roller surface in a wedge shape towards the contact line 11 before some of the gaseous medium is then discharged to the left and some to the right according to the arrows 45 and then 45' in the plan view according to FIG. 6b, i.e., more or less parallel to the rotational axis 8 and the contact line 11, thus also parallel to the air device 40 running transversely, here in the form of the blowing device 41.

In other words, the condensate K forming in this region can be removed from the critical region by targeted blowing. The developing air flow leads the condensate to the outside and keeps the critical region around the contact line free of condensate drops. The gas concentration of the dissolving agent, thus including the plasticisers etc., is reduced by the volume flow of the blowing so that the degree of condensation is reduced. The gaseous flow introduced, usually an air flow introduced, can be preheated, as already indicated, in order to further contain the condensation and to prevent condensation and separation on the machine part. Typical temperatures for the gas flow or in the specific air flow should be between 20° C. and 30° C., for example. The preheating could be between 50° C. and 180° C. The lateral distance DS from the blowing device 41 to the roller-side underside 5a of the melt film 5 or to the surface of the roller jacket 9, as well as the amount of air blown in and the air volume which are preselected such that there are no instabilities when applying the melt film. The distance between the blowing device 41 and the associated outlet nozzles 43 to the contact line 11 should be between 20 mm and preferably 100 mm, for example.

5. Another Exemplary Embodiment

The exemplary embodiment according to FIGS. 7a and 7b differs from the previous exemplary embodiment in that, instead of a blowing device 41 with outlet nozzles 43, a suction device 45 with a plurality of suction nozzles 47 arranged across the length of the suction device and thus across the width of the melt film 5 or with a continuous slit-shaped suction nozzle 47 is used which is suitable for suctioning a condensate K disposed in the critical region Z and discharging it to the outside. The design of the suction device 45 and the associated suction nozzles 47 can be identical or comparable to the rest of the design and especially the arrangement and holding in the blowing device 41 with the outlet nozzles 43.

In other words, the condensate K that forms can be removed from the critical region or intermediate region Z by suctioning along the suction arrows 49 and 49', wherein the air can flow out from the intermediate region Z to the side along the arrows 49 and 49' via the suction device 45 (wherein air-carrying lines, channels, or hoses can also be connected here), so that fresh air or ambient air can then flow in or out more or less parallel to the rotational axis 8 and/or to the contact line 11 according to the arrows 49. The air flow that forms removes the condensate and keeps the critical region in front of the contact line free of condensate. The gas concentration of the dissolving agent and/or of the plasticiser is reduced by the inflowing ambient air, so that the degree of condensation is reduced.

Therefore, the flow arrows in the exemplary embodiment according to FIGS. 7a and 7b are exactly the opposite of the flow arrows in the exemplary embodiment according to FIGS. 6a and 6b.

In addition, the ambient temperature or room temperature can be increased in order to further reduce the condensation. Typical ambient temperatures can be between 20° C. and 50° C., for example. The distance, the amount of air, and the volume of air can in turn be selected such that, as in the previous exemplary embodiment, there are no instabilities when applying the melt or the melt film. The distance from the suction device in this case should also be about 20 mm to 100 mm. Otherwise, refer to the previous exemplary embodiment for the basic structure and/or the arrangement of the suction device 45.

6. Another Exemplary Embodiment as a Combination of the Two Previous Exemplary Embodiments FIG. 8 provides a schematic side view similar to FIGS. 6b and 7b for a combination variant which is designed as a combined blowing and suction device 46.

The arrangement is comparable to the blowing device 41 and the suction device 45 as were explained for the previous two exemplary embodiments. Different therefrom, the combined blowing and suction device 46 can comprise, for example, at least two channels in the longitudinal direction of the device, one channel acting as a blowing channel and the other as a suction channel.

In FIG. 8, the air flows for the suction device are shown with the arrows 49 and 49'. The air preferably flows from the two opposing side regions into the intermediate region between the film and the roller surface and is suctioned via a plurality of suction nozzles 47 provided offset in the longitudinal direction of the suction device.

The thinner arrows 45 and 45' in FIG. 8 represent the flow conditions for the blowing device, in which a gaseous medium, in particular air, is supplied via a separate channel in the combined blowing and suction device 46 and can flow via a plurality of outlet nozzles 43 provided in the longitudinal direction of the combined blowing and suction device, and can flow laterally to the outside in the intermediate region Z.

7. Realization of Improved Process Management

The variant according to FIG. 9 is discussed below; in it, two cooling rollers 1 and 1' are arranged one after the other so that the melt film is guided over a partial wrap angle around the first cooling roller 1 and then around a second cooling roller 1' offset thereto (wherein both cooling rollers can be arranged parallel to and spaced apart from one another). If there is still a risk of condensate forming in the pull-on region between the roller jacket of the second cooling roller 1' and the contact line 11' there, the aforesaid measures can also be implemented for this second cooling roller 1. Defects must also generally be expected on this second roller following the first cooling roller 1. Therefore, one or more of the aforesaid measures can also be used for the second roller (or in the entire system for each roller for which it is feared that condensate will form) in order to prevent condensate from ultimately being pressed into the film.

In order to avoid the aforesaid drawbacks (that is, formation of condensate with a second roller 1' or cooling roller 1'), an appropriately adapted process control can be used to try to change and/or influence the parameters which lead to reduced condensate formation.

Therefore, within the context of the invention, a control device 10 is provided in which the corresponding process parameters can be set and/or changed accordingly or corresponding frequencies can be defined for this purpose, ultimately acting to prevent the formation of condensate or to reduce it to a relevant extent.

Thus, for example, the influence of the condensate on the film can be limited using the cooling of the melt film. This is because the condensate enclosed between the melt film and the roller can only lead to defects in the film if the roller-side surface of the melt film has not yet completely transitioned to the solidified or, for example, semi-crystalline state.

In other words, in addition to one of the measures described above on the first cooling roller, the problem of condensation forming on the roller or cooling roller 1' following the cooling roller 1 can be reduced by setting process parameters appropriately with regard to a desired temperature control such condensate ultimately no longer forms at the contact line 11 of the film on the second roller. In other words, using a suitable process control while achieving optimal temperature control in the melt or in the melt film, it is possible to ensure that the aforesaid problem of condensate forming no longer occurs on a second roller following the cooling roller and no additional measures are necessary here.

The kinetics of crystallization during the cooling of the solvent-containing melt film 5 depends on the dissolving agent content (solvent content) of the plastic mixture and can be determined, for example, by means of DSC measurements, i.e. in so-called "differential scan calorimetry", that is, a device for dynamic differential calorimetry.

The corresponding critical temperature $T_{critical}$, for example in the case of polyethylene (PE), is typically between 80° C. and 110° C., i.e. preferably at a temperature greater than 85° C., 90° C., 95° C., 100° C., or 105° C. Likewise, the preferred temperature is preferably less than 115° C., i.e. in particular is less than 110° C., 105° C., 100° C., 95° C., 90° C., or 85° C.

With other polymers, other temperature ranges are of course possible and should be maintained so that the melt or film solidifies, as explained. As mentioned, appropriate regulation can also be carried out for other polymers depending on the DSC measurements required to determine the solidification point.

By means of the control device 10, selecting the process parameters relevant to the decision, the condition can be set and/or satisfied so that the effects of the condensate on a second roller or cooling roller 1' following the first cooling roller 1 are prevented.

This can be achieved, for example, by setting or preselecting the appropriate process parameters:
- by setting or specifying or regulating a dwell or transfer time for the melt film between exiting the flat slot die or extruder die 3 and application to the roller jacket 9 of the first cooling roller 1 (so that it can be achieved that the region facing the cooling roller has already finally solidified when it meets the roller jacket of the second cooling roller 1' following the cooling roller 1); and/or
- by setting an appropriate ambient temperature, optionally also by preselecting or setting a desired temperature for the gaseous medium blown into the sub-region, in particular in the form of appropriately heated air; and/or
- by setting, specifying or regulating an appropriate roller temperature (i.e., preselecting the appropriate roller jacket temperature $T_R$; and/or
- by setting, specifying or regulating for changing the dissolving agent content by choosing the appropriate volume and/or weight proportion of the plastic material for the melt film; and/or
- by appropriately setting, specifying, or regulating the melt film thickness.

Appropriately setting or preselecting or specifying one or a plurality of the aforesaid process parameters can ensure that solidification of the melt film is complete before it reaches the cooling roller surface of the second cooling roller 1' or is substantially complete with more than 60%, in particular more than 70%, 80% and in particular more than 90% or 95% or even 100% completely solidified in order to reduce or even prevent the effects of the condensate.

Through these measures, the occurrence of condensate defects, especially on the underside of the melt film on the second roller 1', can be reduced and even eliminated.

For example, heating the roller jacket temperature $T_R$ in regions which are, for example, between 65° C. and 115° C. has also proven particularly suitable. As a rule, such cooling temperatures on the cooling roller are sufficient to prevent condensation at the contact point or the contact line for the melt film and the jacket of the cooling roller.

If the cooling effect as a whole is not sufficient for cooling the melt film, then an embodiment can also be selected if necessary as is shown only by way of example for FIG. 2.

General Note

The invention has been explained on the basis of a melt or a so-called melt film or cast film 5 which is output from a die 3, in particular a slot die 3, for example an extruder die 3, onto a surface of a cooling roller.

As already explained in the foregoing, however, the information provided also applies to all other films 5' in which substances, such as in particular dissolving agents and/or plasticisers or etc., can escape under certain conditions or operating conditions while forming a condensate, especially in one region in which a corresponding film in a wedge-shaped tapered region meets a roller jacket of a roller along a contact line, wherein the roller may be called a cooling roller if the roller or the roller jacket or the roller surface is cooler than the temperature of the plastic film.

In all of these cases, the measures according to the invention could be taken to reduce the formation of condensate or, as described, to more or less completely prevent it. Therefore no limitation on a melt or melt film is provided within the context of the invention, especially when said melt or melt film is placed on a cooling roller.

Furthermore, it should be noted that different variants of the aforesaid invention can be provided and implemented not only individually by themselves, but also cumulatively.

Thus, for example, the cover mat 21 (for example in the form of a cover, a covering, or a nonwoven fabric) or a cover wall 21' used on the basis of the aforesaid exemplary embodiment can be used not only when the process parameters are changed as explained in the context of the first exemplary embodiment, but also, for example, when using a heating device and in particular a wedge-shaped heating device 31, a blowing device 41, or a suction device 45.

The blowing device can also be provided in addition to a heating device, or also in addition to the shielding mat 21 or cover wall 21'. Finally, the blowing device, a heating device, and the shielding mat and/or the cover wall can be used in order to either prevent the separation of condensate or to drain such condensate such that separated condensate cannot be pressed into the melt film. Finally, the aforesaid absorbent material layer can also be supplemented and used in all the exemplary embodiments, and could preferably be used in connection with a solid shielding wall 21', but in principle also when using a shielding mat 21. The same also applies to forming a drainage channel in connection with the explained cover device 19.

Thus, in all of these cases, existing condensate separation is rendered ineffective and/or by using a heating device or other measures such as an absorbent layer it is ensured that condensate that has separated cannot precipitate at all when using a heating device because the temperatures are too high.

Finally, it should also be mentioned that the aforesaid devices preferably extend at least across the entire width of the melt film, but preferably beyond at least a certain axial dimension. The corresponding devices should preferably extend across at least 60% of the total width of the film, wherein this minimum extension can also be greater than 70%, greater than 80% and greater than 90% thereof. Of course, the devices can also be longer than the total width of the film. In other words, the aforesaid devices should ultimately be effective across the entire width of the melt film in order not to cause any disadvantageous effects.

The aforesaid process parameters which lead to improvement in the context of the invention can additionally also be provided when using the aforesaid heating device 31, blowing device 41, or suction device 45.

Finally, the blowing device 41 or the suction device 45 can additionally be provided with a heating device in order to achieve the advantages described for the aforesaid heating wedge 31'.

Just these examples demonstrate that in principle individual or all measures can be combined with one another, provided that their modes of operation are not mutually contradictory. The fact that even the blowing device and the suction device can be combined with one another has been explained using a separate exemplary embodiment and referring to FIG. 8.

The invention claimed is:

1. A device for producing a monoaxially or biaxially stretched plastic film, the device comprising:
   an extruder,
   a cooling roller, to which a melt film or plastic film is fed from the extruder and is placed along a contact line on a roller jacket of the cooling roller, from where the melt or plastic film is conveyed over a partial wrap angle around the cooling roller,
   wherein a wedge-shaped intermediate space tapering towards the contact line is formed between the melt or plastic film and the roller jacket, a geometry of the intermediate space being defined by a plane of the melt or plastic film between the extruder and contact line, a portion of the roller jacket facing the plane of the melt or plastic film, and a plane extending from the roller jacket to an opposing line extending across the width of the melt or plastic film, the opposing line being spaced from both the extruder and the contact line, and the plane of the melt or plastic film defining an acute angle with the roller jacket at the contact line,
   wherein the device further comprises at least one device for preventing condensate from precipitating on the underside of the melt or plastic film facing the roller jacket, on the roller jacket, or on a roller surface of the cooling roller, wherein the at least one device for preventing condensate is provided entirely within the intermediate space and is designed such that:
   a) precipitation of condensate on the underside of the melt or plastic film facing the roller jacket, and/or on the roller jacket is prevented by means of a portion of a cover device or shielding device,
   b) precipitated condensate evaporates or vaporises, and/or
   c) condensate located in the intermediate space is transported away, suctioned off, blown off, and/or run out.

2. The device according to claim 1, wherein the at least one device for preventing condensate comprises the shielding device or cover device, the shielding or cover device being in the form of a shielding mat or cover wall and being non-rotating and/or held in place relative to the cooling roller and extending into the intermediate space, the shielding mat or cover wall resting on the roller jacket in a partial circumferential region thereof at least in the region of the melt film or plastic film, and the shielding mat or cover wall terminating at a distance in front of the contact line, the cooling roller rotating beneath the shielding mat or cover wall.

3. The device according to claim 2, wherein the shielding mat is provided and comprises one or more of the following materials: fabrics, paper, leather, non-wovens, polymer foams in the form of neoprene, imitation neoprene, and/or foam rubber, synthetic leather, polyester, cellulose, polypropylene, and polyamide.

4. The device according to claim 2, wherein the shielding mat or cover wall has a thickness between 10 µm to 4 mm, and/or mass per unit area between 30 g/m² to 100 g/m².

5. The device according to claim 2, wherein the shielding mat or cover wall does not comprise protruding single fibres.

6. The device according to claim 2, wherein the shielding mat or cover wall terminates at a distance of 1 mm to 30 mm from the contact line along the outer circumference of the cooling roller.

7. The device according to claim 1, wherein the cover or shielding device is provided and comprises or includes a flexible shielding mat comprising:
   a) non-porous, non-perforated, condensate-impermeable or water-impermeable and/or liquid-tight material, or
   b) a fabric-like, porous, perforated, non-water-tight and/or absorbent material.

8. The device according to claim 1, wherein the at least one device for preventing condensate comprises an air circulation device via which condensate-laden air in the intermediate space is removed and replaced by condensate-free fresh air.

9. The device according to claim 8, wherein the air circulation device is provided in the form of a blowing device which is provided in a region thereof facing the contact line with one or more outlet nozzles offset to one another and via which fresh or ambient air from the outside is suctioned in and blown into the intermediate space so that the condensate-laden air is blown out to opposing outlet sides of the intermediate space.

10. The device according to claim 8, wherein the air circulation device is provided in the form of a suction device or in the form of a suction and blowing device which in a region thereof facing the contact line is provided with one or more suction nozzles or openings offset to one another and via which the condensate-laden air is suctioned off from the intermediate space.

11. The device according to claim 1, wherein the at least one device for preventing condensate comprises the cover or shielding device, the cover or shielding device comprising a V-shaped drain device forming a channel-like drainage region for capturing condensate precipitating on a top of the cover or shielding device and diverting the captured condensate away from the contact line.

12. The device according to claim 1, wherein the at least one device for preventing condensate comprises a wedge-shaped heating element having an end thereof spaced from the contact line by 5 mm to 30 mm.

13. A method for producing a monoaxially or biaxially stretched plastic film using the device of claim 1, the method comprising:
   extruding the melt film or plastic film onto the cooling roller;
   removing and absorbing the condensate using the at least one condensate preventing device; and,
   cooling the film.

14. The method according to claim 13, wherein the at least one device for preventing condensate comprises the cover or shielding device, the cover or shielding device being held in the intermediate space in a non-rotating manner with respect to the cooling roller.

15. The method according to claim 13, wherein the at least one device for preventing condensate comprises the cover or shielding device as a shielding mat or cover wall having a thickness between 10 µm to 4 mm and/or a mass per unit area between 30 g/m² to 100 g/m².

* * * * *